United States Patent
Ueno et al.

(10) Patent No.: US 12,491,891 B2
(45) Date of Patent: Dec. 9, 2025

(54) INFORMATION PROCESSING DEVICE, VEHICLE, INFORMATION PROCESSING SYSTEM, INFORMATION PROCESSING METHOD, AND NON-TEMPORARY STORAGE MEDIUM

(71) Applicant: TOYOTA JIDOSHA KABUSHIKI KAISHA, Toyota (JP)

(72) Inventors: Hiroshi Ueno, Toyota (JP); Yoshihisa Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 18/372,248

(22) Filed: Sep. 25, 2023

(65) Prior Publication Data
US 2024/0109546 A1  Apr. 4, 2024

(30) Foreign Application Priority Data
Sep. 29, 2022  (JP) ................................ 2022-156024

(51) Int. Cl.
*B60W 40/00*   (2006.01)
*B60W 30/18*   (2012.01)
*B60W 40/105*  (2012.01)

(52) U.S. Cl.
CPC .... *B60W 40/105* (2013.01); *B60W 30/18154* (2013.01); *B60W 30/18027* (2013.01); *B60W 2540/106* (2013.01); *B60W 2556/45* (2020.02)

(58) Field of Classification Search
CPC ......... B60W 40/105; B60W 30/18154; B60W 30/18027; B60W 30/181; B60W 2540/106; B60W 2540/10; B60W 2540/12; B60W 2556/45; B60W 2556/10; B60W 2520/10; B60W 2520/105
See application file for complete search history.

(56) References Cited

U.S. PATENT DOCUMENTS

| | | | | |
|---|---|---|---|---|
| 9,514,648 | B2 * | 12/2016 | Kawamata | G08G 1/163 |
| 2004/0158390 | A1 * | 8/2004 | Mukaiyama | G01C 21/26 701/400 |
| 2005/0222753 | A1 * | 10/2005 | Ishikawa | G08G 1/165 701/96 |
| 2010/0063725 | A1 * | 3/2010 | Miura | G01C 21/26 701/408 |

(Continued)

FOREIGN PATENT DOCUMENTS

| | | |
|---|---|---|
| JP | 2007-328612 A | 12/2007 |
| JP | 2009-245120 A | 10/2009 |

(Continued)

*Primary Examiner* — Phutthiwat Wongwian
*Assistant Examiner* — Sherman D Manley
(74) *Attorney, Agent, or Firm* — Oliff PLC

(57) ABSTRACT

An information processing device configured to calculate a feature related to driving of a vehicle includes a first processor configured to receive input information including information on a speed of the vehicle and a second processor configured to calculate the feature by using the input information received during a first period in which predetermined conditions are satisfied. The first period being included in a second period in which the input information is received. The predetermined conditions include a condition that a driving operation is performed before a brief stop of the vehicle.

8 Claims, 4 Drawing Sheets

(56) References Cited

U.S. PATENT DOCUMENTS

| | | | |
|---|---|---|---|
| 2011/0025529 A1* | 2/2011 | Uechi | G08G 1/096783 |
| | | | 340/905 |
| 2018/0173237 A1* | 6/2018 | Reiley | B60Q 1/5035 |
| 2019/0011913 A1* | 1/2019 | Chu | G01S 13/726 |
| 2019/0031172 A1* | 1/2019 | Kodera | B60W 30/18154 |
| 2019/0126932 A1* | 5/2019 | Nishimura | B60W 40/04 |
| 2020/0132486 A1 | 4/2020 | Hori et al. | |
| 2021/0061269 A1* | 3/2021 | Petroff | B60W 30/18159 |
| 2021/0086773 A1* | 3/2021 | Kogano | B60W 30/18154 |
| 2023/0162541 A1* | 5/2023 | Yamada | B60W 40/09 |
| | | | 701/33.4 |
| 2023/0174093 A1* | 6/2023 | Inoue | B60W 30/0956 |
| | | | 340/425.5 |
| 2024/0119762 A1* | 4/2024 | Yamada | G07C 5/008 |

FOREIGN PATENT DOCUMENTS

| | | |
|---|---|---|
| JP | 2010-039888 A | 2/2010 |
| JP | 2020-071127 A | 5/2020 |
| JP | 2021-051341 A | 4/2021 |
| WO | 2009/122284 A1 | 10/2009 |

\* cited by examiner

ID/VEHICLE, INFORMATION PROCESSING
SYSTEM, INFORMATION PROCESSING
METHOD, AND NON-TEMPORARY
STORAGE MEDIUM

CROSS-REFERENCE TO RELATED
APPLICATION

This application claims priority to Japanese Patent Application No. 2022-156024 filed on Sep. 29, 2022, incorporated herein by reference in its entirety.

BACKGROUND

1. Technical Field

The present disclosure relates to a technology for evaluating driving features of a driver using information Obtained from a vehicle.

2. Description of Related Art

For example, Japanese Unexamined Patent Application Publication No. 2009-245120 discloses a technology that detects a visibility distance between a driver's own vehicle and an intersecting object at an intersection when the vehicle enters the intersection, and diagnoses whether the driver of the vehicle behaved correctly based on the detected visibility distance.

SUMMARY

In vehicles such as that described above, the visibility distance is detected and acquired using a sensor or an image identification device, and therefore the processing and configuration may become complicated. Further, in a vehicle that is not equipped with such a device, it may not be possible to diagnose whether the vehicle is driven correctly.

The present disclosure provides an information processing device, a vehicle, an information processing system, an information processing method, and a non-temporary storage medium that enable appropriate evaluation of driving features without using an image identification device.

An information processing device relates to a first aspect of the present disclosure is configured to calculate a feature related to driving of a vehicle. The information processing device includes a first processor and a second processor. The first processor is configured to receive input information including information on a speed of the vehicle. The second processor is configured to calculate the feature by using the input information received during a first period in which predetermined conditions are satisfied. The first period is included in a second period in which the input information is received. The predetermined conditions include a condition that a driving operation is performed before a brief stop of the vehicle.

With the configuration described above, when the brief stop of the vehicle is performed, it is possible to calculate the feature related to the driving of the vehicle using the information on the speed of the vehicle. Therefore, the feature can be calculated without using a device such as a sensor or an image identification device.

In the first aspect, the condition that the driving operation is performed before the brief stop may include a condition in which the speed of the vehicle exceeds a first threshold, a condition that an accelerator release operation is performed, and a condition that the vehicle is in a decelerating state.

With the configuration described above, when the brief stop of the vehicle is performed, it is possible to calculate the feature related to the driving of the vehicle using the information related to the speed of the vehicle.

In the first aspect, the condition that a driving operation is performed before the brief stop may include a condition that the driving operation is performed within a predetermined period of time after an activation operation for the vehicle is performed, and a condition that the speed of the vehicle is equal to or less than a threshold value during a period from the activation operation to immediately before.

With the configuration described above, when the brief stop of the vehicle is performed, it is possible to calculate the feature related to the driving of the vehicle using the information related to the speed of the vehicle.

In the first aspect, the second processor may be configured to calculate a first feature related to a stop of the vehicle.

With the configuration described above, it is possible to appropriately evaluate the driving features of the vehicle using the feature related to the stop of the vehicle.

In the first aspect, the second processor may be configured to calculate, as the first feature, information indicating whether to execute the brief stop.

With the configuration described above, it is possible to appropriately evaluate the driving features of the vehicle using the information indicating whether the brief stop of the vehicle is executed.

In the first aspect, the information processing device may further include a third processor configured to calculate a ratio of an execution count of the brief stops to a reference count by using the first feature.

With the configuration described above, it is possible to evaluate whether the brief stops are executed at an appropriate rate, so that it is possible to appropriately evaluate the driving features of the vehicle.

In the first aspect, the second processor may be configured to calculate a second feature related to a safety confirmation in an advancing direction of the vehicle.

With the configuration described above, it is possible to appropriately evaluate the driving features of the vehicle using the second feature related to the safety confirmation in front of the vehicle.

In the first aspect, the second processor may be configured to calculate, as the second feature, information indicating whether to execute a slow forward movement after the brief stop.

With the configuration described above, it is possible to appropriately evaluate the driving features of the vehicle using the information indicating whether the slow forward movement of the vehicle is executed.

In the first aspect, the information processing device may further include a third processor configured to calculate a ratio of an execution count of the slow forward movements to a reference count by using the second feature.

With the configuration described above, it is possible to evaluate whether the slow forward movements are performed at an appropriate rate, so that it is possible to appropriately evaluate the driving features of the vehicle.

A vehicle related to a second aspect of the present disclosure includes the information processing device.

An information processing system related to a third aspect of the present disclosure includes the information processing device and a server. The information processing device calculates a feature related to driving of a vehicle. The server manages information transmitted from the information processing device.

An information processing method related to a fourth aspect of the present disclosure is the information processing method for calculating a feature related to driving of a vehicle. The information processing method includes a step of receiving input information including information on a speed of the vehicle, and a step of calculating the feature by using the input information received during a first period in which predetermined conditions are satisfied. The first period is included in a second period in which the input information is received. The predetermined conditions include a condition that a driving operation is performed before a brief stop of the vehicle.

A fifth aspect of the present disclosure relates to a non-transitory storage medium that stores an instruction executable by one or more processors in a computer and causing the one or more processors to perform following functions. The functions include receiving input information including information on a speed of the vehicle, and calculating a feature related to driving of the vehicle by using the input information received, during a first period in which the input information is received. The first period is included in a second period in which predetermined conditions including a condition that a driving operation is performed before a brief stop of the vehicle is satisfied.

With each aspect of the present disclosure, it is possible to provide an information processing device, a vehicle, an information processing system, an information processing method, and a non-transitory storage medium that enable appropriate evaluation of driving features without using an image identification device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION EMBODIMENTS

Figure 1:
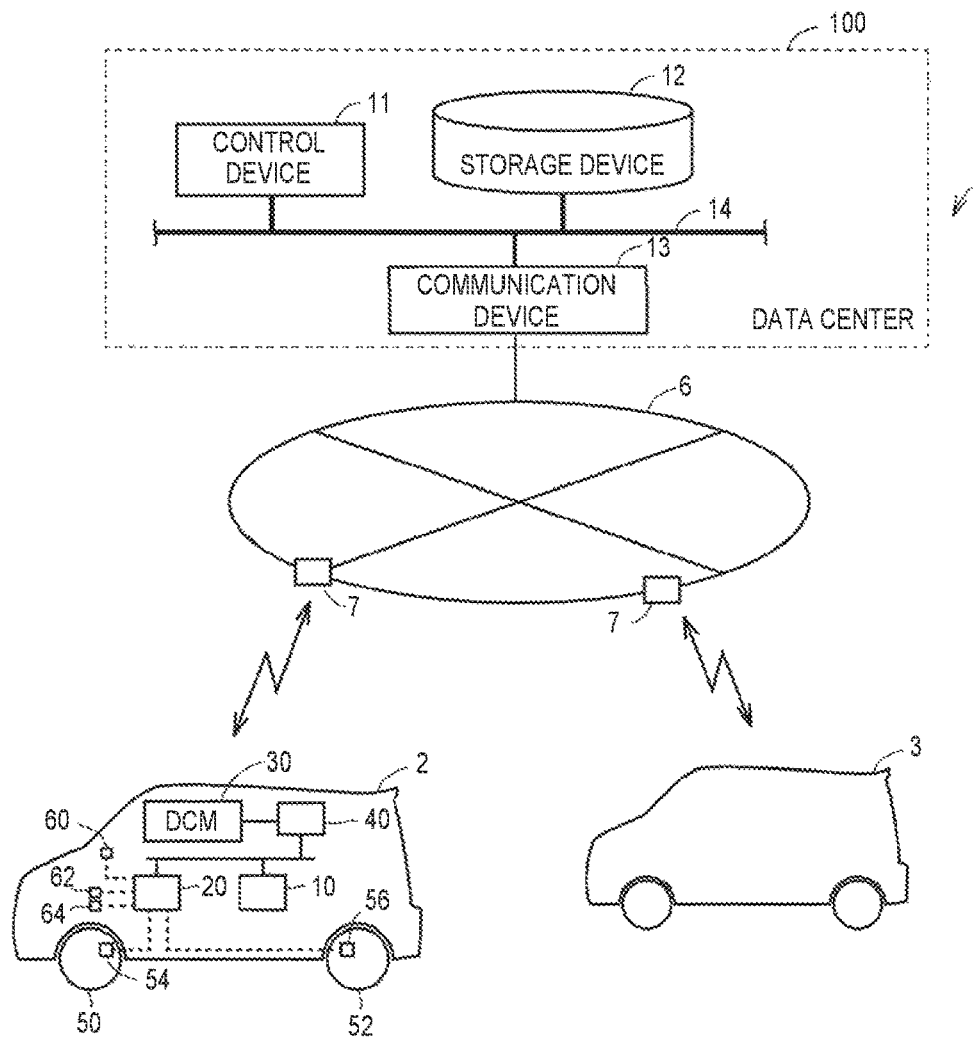
FIG. 1 is a diagram for illustrating an example of a configuration of an information management system.

Hereinafter, an embodiment of the present disclosure will be described in detail while referring to the drawing. In addition, the same or equivalent components in the drawings are denoted by the same reference numerals and letters, and the description thereof will not be repeated.

FIG. 1 is a diagram for illustrating an example of a configuration of an information management system 1. As illustrated in FIG. 1, in the present embodiment, the information management system 1 includes a plurality of vehicles 2, 3, a communication network 6, a base station 7, and a data center 100.

The vehicles 2, 3 may be any vehicles as long as they can communicate with the data center 100, and for example, they may be a vehicle with an engine as a driving source, an electric car with an electric motor as a driving source, or a hybrid car that is equipped with an engine and an electric motor and uses at least one of them as a driving source. In FIG. 1, for the convenience of the description, only two vehicles 2, 3 are illustrated, but the number of vehicles is not particularly limited to two and may be three or more.

The information management system 1 is configured to acquire predetermined information from the vehicles 2, 3 configured to communicate with the data center 100, and to manage the acquired information.

The data center 100 includes a control device 11, a storage device 12, and a communication device 13. The control device 11, the storage device 12, and the communication device 13 are communicably connected to each other by a communication bus 14.

The control device 11 includes a central processing unit (CPU), a memory (read only memory (ROM) and random access memory (RAM)), an input/output port for inputting and outputting various signals, and the like, although none of them are illustrated. Various controls executed by the control device 11 are executed by software processing. That is, a program stored in the memory is read by the CPU. Various controls by the control device 11 can also be realized by a general-purpose server (not illustrated) executing a program stored in a storage medium. However, various controls by the control device 11 may not be limited to software processing and may be processed by dedicated hardware (electronic circuit).

The storage device 12 stores predetermined information on the plurality of vehicles 2, 3 configured to communicate with the data center 100. The predetermined information includes information on a feature of each of the vehicles 2, 3 described below, and information (hereinafter referred to as a vehicle ID) for specifying the vehicles 2, 3. The vehicle ID is unique information set for each vehicle. The data center 100 can specify a transmitter vehicle by the vehicle ID.

The communication device 13 realizes two-way communication between the control device 11 and the communication network 6. The data center 100 can communicate with a plurality of vehicles, including the vehicles 2, 3, via the base station 7 provided on the communication network 6 using the communication device 13.

Next, specific configurations of the vehicles 2, 3 will be described. Since the vehicles 2, 3 basically have a common configuration, the following is a typical description of the configuration of the vehicle 2.

The vehicle 2 includes a driving wheel 50 and a driven wheel 52. The driving source rotates the driving wheel 50, generating a force that is transmitted to the vehicle 2, causing the vehicle 2 to travel.

The vehicle 2 includes an ADAS-electronic control unit (ECU) 10, a brake ECU 20, a data communication module (DCM) 30, and a central ECU 40.

The ADAS-ECU 10, the brake ECU 20, and the central ECU 40 are all computers having a processor for executing a program such as a CPU, a memory, and an input/output interface.

The ADAS-ECU 10 includes a driver assistance system that has a function related to driving support for the vehicle 2. The driver assistance system is configured to realize various functions for supporting the driving of the vehicle 2 including at least one of steering control, driving control, and braking control of the vehicle 2 by executing an application to be implemented. The application implemented in the driver assistance system includes, for example, applications that realize the function of an advanced driver assistance system (ADAS).

Each application of this driver assistance system outputs a request for a kinematic plan that ensures the commerciality (function) of the application alone to the brake ECU 20 based on information on a peripheral status of the vehicle acquired (input) from a plurality of sensors (not illustrated), a support request from a driver, and the like. The plurality of sensors includes, for example, a vision sensor such as a front camera, a radar, a light detection and ranging (LiDAR) device, and a position detection device.

Each application will acquire information on the peripheral status of the vehicle that integrates one or more sensor detection results as recognition sensor information, and acquire the support request from the driver via a user interface (not illustrated) such as a switch. Each application can recognize other vehicles, obstacles, or people around the vehicle through artificial intelligence (AI) for images and videos around the vehicle acquired by a plurality of sensors and image processing using an image processing processor.

The kinematic plan also includes, for example, requests for the front and rear acceleration deceleration generated in the vehicle 2, the request for the steering angle of the vehicle 2, and the request for stop holding of the vehicle 2.

The brake EC 20 controls a brake actuator that generates a braking force on the vehicle 2 using detection results from sensors. Further, the brake ECU 20 sets a motion request of the vehicle 2 for realizing the kinematic plan request from the ADAS-ECU 10. The motion request of the vehicle 2 set in the brake ECU 20 is realized by an actuator system (not illustrated) provided in the vehicle 2. The actuator system includes, for example, a plurality of types of actuator systems such as powertrain systems, braking systems, and steering systems.

A steering angle sensor 60, an accelerator pedal depression degree sensor 62, a stop lamp switch 64, a first wheel speed sensor 54, and a second wheel speed sensor 56 are connected to the brake ECU 20, for example.

The steering angle sensor 60 detects a steering angle. The steeling angle sensor 60 transmits a signal indicating the detected steeling angle to the brake ECU 20.

The accelerator pedal depression degree sensor 62 detects a degree of depression of an accelerator pedal (not illustrated). The accelerator pedal depression degree sensor 62 transmits a signal indicating the detected degree of depression of the accelerator pedal to the brake ECU 20.

The stop lamp switch 64 detects whether a brake pedal (not illustrated) is depressed. The stop lamp switch 64 is configured, for example, to turn on when the degree of depression of the brake pedal exceeds a threshold value, and to turn off when the degree of depression of the brake pedal falls below a threshold value. The stop lamp switch 64 transmits information indicating whether the brake pedal has been depressed to the brake ECU 20.

The first wheel speed sensor 54 detects the rotation number (wheel speed) of the driving wheel 50. The first wheel speed sensor 54 transmits a signal indicating the detected rotation number of the driving wheel 50 to the brake ECU 20.

The second wheel speed sensor 56 detects the rotation number of the driven wheel 52. The second wheel speed sensor 56 transmits a signal indicating the detected rotation number of the driven wheel 52 to the brake ECU 20.

In addition, although in FIG. 1, a configuration in which the steering angle sensor 60, the accelerator pedal depression degree sensor 62, the stop lamp switch 64, the first wheel speed sensor 54, and the second wheel speed sensor 56 are connected to the brake ECU 20 and the detection results are directly transmitted to the brake ECU 20 is described as an example, either sensor or the like may be connected to another ECU, and detection results may be input to the brake ECU 20 via a communication bus or the central ECU 40.

Further, for example, the brake ECU 20 receives from the ADAS-ECU 10 information on the kinematic plan, information on the operation state of various applications, information on other driving; operations such as the shift range, and information on the behavior of the vehicle 2.

The DCM 30 is a communication module configured to enable two-way communication with the data center 100.

The central ECU 40 is, for example, configured to be communicable with the brake ECU 20 and is configured to be communicable with the data center 100 using the DCM 30. The central ECU 40, for example, transmits information received from the brake ECU 20 to the data center 100 via the DCM 30.

In the present embodiment, although the central ECU 40 is described as transmitting information received from the brake ECU 20 to the data center 100 via the DCM 30, for example, it may have functions (gateway function) such as relaying communication between various ECUs. Also, the central ECU 40 may include a memory (not illustrated) of which stored contents can be updated using update information from the data center 100, and predetermined information including the update information stored in the memory may be read out from various ECUs when a system of the vehicle 2 is activated.

For example, when the vehicle 2 having the above configuration enters an intersection without traffic lights and makes a right turn, it is possible to evaluate whether the vehicle 2 is being driven appropriately, such as stopping briefly and confirming safety, using driving history or the like. In this case, when a sensor or an image identification device is used to acquire the status of the vehicle 2 at the intersection, the processing and configuration may become complicated. On the other hand, in a vehicle that is not equipped with such devices, it may not be possible to accurately diagnose whether the vehicle is driving correctly.

Therefore, in the present embodiment, the brake ECU 20 includes a first processing unit that receives input information including information on the speed of the vehicle 2, and a second processing unit that calculates a feature related to driving of the vehicle 2 using input information received during a period in which predetermined conditions are satisfied during a period in which the input information is received. Here, the predetermined conditions include a condition that a driving operation is performed before the brief stop of the vehicle.

In this way, when the vehicle 2 is briefly stopped, it is possible to calculate the feature related to the driving of the vehicle using information on the speed of the vehicle 2. Therefore, the feature can be calculated without using a device such as a sensor or an image identification device.

Figure 2:
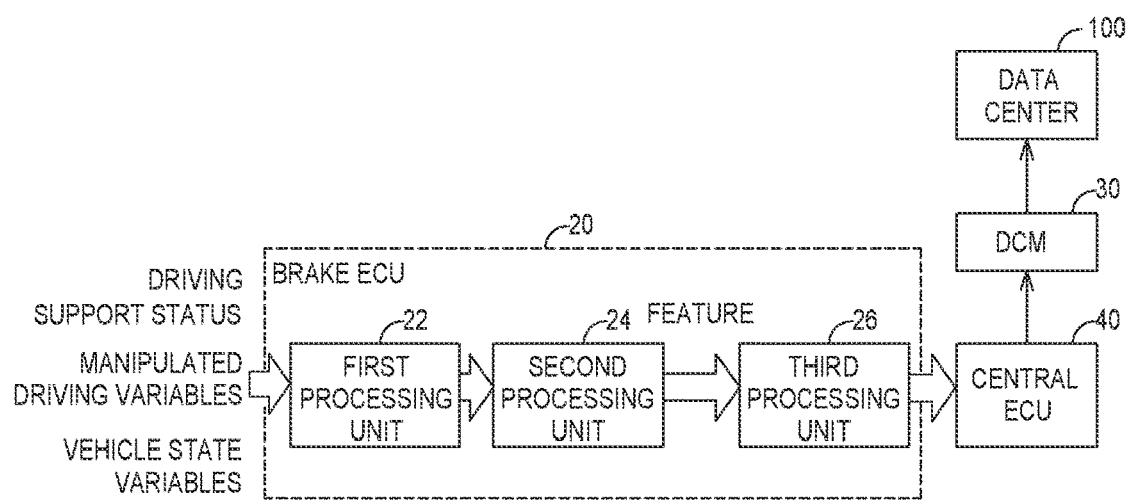
FIG. 2 is a diagram for illustrating a configuration of an example of the information processing device according to a present embodiment.

FIG. 2 is a diagram for illustrating a configuration of an example of the information processing device according to the present embodiment. The information processing device according to the present embodiment is implemented by the brake ECU 20.

The brake ECU 20 includes a first processing unit 22, a second processing unit 24, and a third processing unit 26. The first processing unit 22 receives information indicating the degree of depression of the accelerator pedal and information indicating whether the brake pedal has been depressed as information on the driving operation of the vehicle 2. Further, the first processing unit 22 receives a request for a kinematic plan from the ADAS-ECU 10 and information indicating the operating state of the driver assistance system as information on the operating state of the driving support of the vehicle 2. Further, the first processing unit 22 receives information indicating detection results from various sensors and the like as information on the behavior of the vehicle 2, The first processing unit 22 outputs, to the second processing unit 24, the input information received during a period in which predetermined conditions are satisfied during the period in which the input information is received.

The predetermined conditions include a condition that the driving status of the vehicle 2 is a predetermined driving status corresponding to the feature. In the present embodiment, the predetermined conditions include a condition that a driving operation is performed before the brief stop of the vehicle. The predetermined conditions include a first condition in which the speed of the vehicle 2 exceeds a threshold value, a second condition that the accelerator is in a released state, and a third condition that the acceleration of the vehicle 2 is less than zero. The threshold value is a threshold value for determining that the speed of the vehicle is within a non-traffic congestion speed range. The predetermined conditions are not particularly limited to the conditions described above as long as it can be determined that the vehicle 2 has decelerated from the non-traffic congestion speed range and that a driving operation is performed before a brief stop of the vehicle. The first processing unit 22 calculates the speed and acceleration of the vehicle 2 using, for example, the rotation number of the driving wheel 50 and the rotation number of the driven wheel 52. The first processing unit 22 determines that the predetermined conditions are satisfied, for example, when all of the first condition, the second condition, and the third condition are satisfied. For example, when the condition that the accelerator is in a depressed state after the first condition, the second condition, and the third condition are satisfied, and the speed of the vehicle 2 exceeds a threshold value (for example, 10 to 19 kilometers per hour) indicating a slow speed, the first processing unit 22 determines that the predetermined conditions are not satisfied. The first processing unit 22 turns on a satisfaction flag when the first processing unit 22 determines that the predetermined conditions are satisfied. The first processing unit 22 outputs input information to the second processing unit 24 when the satisfaction flag is in an ON state.

The second processing unit 24 calculates a feature relating to the operation of the vehicle 2 using the input information received during the period in which the predetermined conditions are satisfied during the period in which the input information is received.

Figure 3:
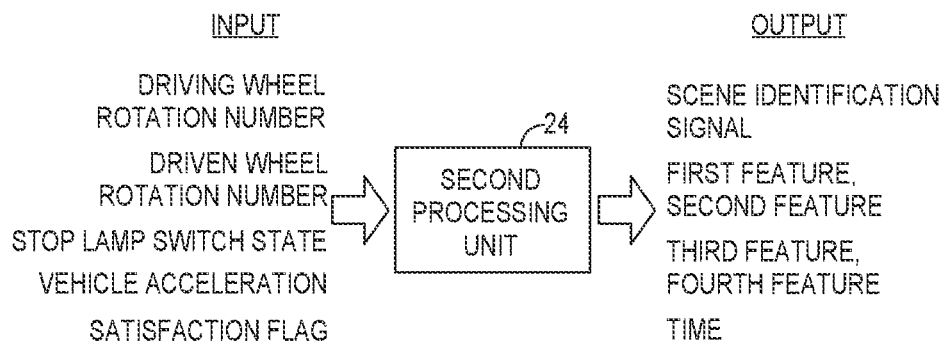
FIG. 3 is a diagram for illustrating an example of processing executed in a second processing unit.

FIG. 3 is a diagram for illustrating an example of processing executed in the second processing unit 24. As illustrated in FIG. 3, the rotation number of the driving wheel 50 the rotation number of the driven wheel 52, an ON/OFF state of the stop lamp switch 64, the vehicle acceleration, and the state of the satisfaction flag are inputted from the first processing unit 22 to the second processing unit 24 as input information. The second processing unit 24 sets various features using the input information.

In the present embodiment, the feature includes a first feature that is information indicating whether a driver has stopped the vehicle 2 briefly, a second feature that is information indicating whether the driver has performed slow forward movements of the vehicle 2 after briefly stopping the vehicle 2, a third feature that indicates a movement distance by the execution of the slow forward movements after brief stopping, and a fourth feature that indicates a distance traveled until the vehicle 2 reaches a predetermined vehicle speed through slow forward movements after brief stopping.

The second processing unit 24 uses the input information to set the first feature, the second feature, the third feature, and the fourth feature.

Setting Processing of First Feature

The second processing unit 24 determines whether the vehicle 2 has been briefly stopped when the satisfaction flag is the ON state. For example, when neither the first wheel speed sensor 54 nor the second wheel speed sensor 56 outputs a detection result (or outputs a detection result indicating that the rotation number is zero), and the stop lamp switch 64 is in the ON state and this state continues for a predetermined time (for example, about several hundred milliseconds), the second processing unit 24 determines that the vehicle 2 has been briefly stopped. In this case, the second processing unit 24 sets a value (for example, 1) indicating that the vehicle 2 has been briefly stopped as the first feature. When the second processing unit 24 determines that the vehicle 2 has not been briefly stopped, the second processing unit 24 sets a value (for example, 0) indicating that the vehicle 2 has not been briefly stopped.

Setting Processing of Second Feature

The second processing unit 24 determines whether the vehicle 2 moves forward slowly after the value indicating that the vehicle 2 has been briefly stopped is set as the first feature. For example, when both the rotation number of the driving wheel 50 and the rotation number of the driven wheel 52 are greater than zero, and the amount of change in the speed of the vehicle 2 is equal to or less than a threshold value dVx and this state continues for a predetermined period (for example, about several hundred milliseconds), the second processing unit 24 determines that the vehicle 2 has moved forward slowly. In this case, the second processing unit 24 sets a value (for example, 1) indicating that the vehicle has moved forward slowly as the second feature. When the second processing unit 24 determines that the vehicle 2 has not moved forward slowly, the second processing unit 24 sets a value (for example, 0) indicating that the vehicle 2 has not moved forward slowly.

Setting Processing of Third Feature

The second processing unit 24 sets a movement distance of the vehicle 2 from the time when the vehicle 2 stops to the time when the vehicle 2 completes the slow forward movement as the third feature.

For example, when the vehicle 2 enters an acceleration state in which the amount of change in speed exceeds the threshold value dVx, the second processing unit 24 calculates the movement distance in the period from the time when the vehicle 2 is briefly stopped to the time when the vehicle 2 enters the acceleration state. The second processing unit 24, for example, calculates the movement distance by time-integrating the change history of the vehicle speed from the time when the vehicle speed is zero to the time when the vehicle enters the acceleration state. The second processing unit 24 sets the calculated movement distance as the third feature.

For, example, the second processing unit 24 may calculate the movement distance of the vehicle 2 using a tire diameter by accumulating the rotation number of the driving wheel 50 or the rotation number of the driven wheel 52 in the period from the time when the vehicle 2 is briefly stopped until the time when the vehicle 2 is accelerated.

Setting Processing of Fourth Feature

When the speed of the vehicle 2 reaches a predetermined speed after moving forward slowly, the second processing unit 24 sets the movement distance of the vehicle 2 from the time when the vehicle 2 stops to the time when the vehicle 2 reaches the predetermined speed as the fourth feature.

The second processing unit 24, for example, calculates the movement distance by time-integrating the change history of the vehicle speed from the time when the vehicle speed is zero to the tune when it reaches the predetermined speed. The second processing unit 24 sets the calculated movement distance as the fourth feature.

For example, the second processing unit 24 may calculate the movement distance of the vehicle 2 using the tire diameter by accumulating the rotation number of the driving wheel 50 or the rotation number of the driven wheel 52 in the period from the time when the vehicle 2 is briefly stopped until it reaches the predetermined speed.

The second processing unit 24 outputs to the third processing unit 26 as a scene identification signal a signal indicating the state of the satisfaction flag in addition to the first feature, the second feature, the third feature, and the fourth feature. The second processing unit 24 stops calculating the first feature, the second feature, the third feature, and the fourth feature or outputting them to the second processing unit 24 when the satisfaction flag is in an OFF state.

The third processing unit 26 uses the information output from the second processing unit 24 to generate information on driving features.

Figure 4:
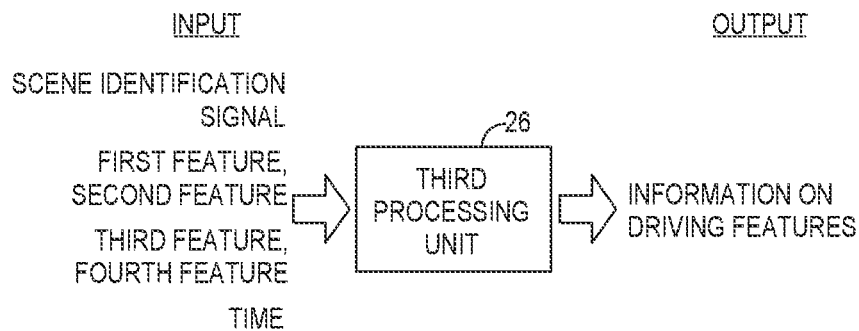
FIG. 4 is a diagram for illustrating an example of processing executed in a third processing unit.

FIG. 4 is a diagram for illustrating an example of processing executed in the third processing unit 26. As illustrated in FIG. 4, information indicating the scene identification signal, the first feature, the second feature, the third feature, the fourth feature, and the time is input from the second processing unit 24 to the third processing unit 26.

The third processing unit 26 outputs information necessary for determining whether the change history of the feature corresponds to a predetermined state at the data center 100. Specifically, the third processing unit 26 generates information on driving features using, for example, the first feature, the second feature, the third feature, and the fourth feature, and outputs the generated information to the central ECU 40.

The third processing unit 26 uses the first feature to calculate an execution count Na of brief stops during one trip. The third processing unit 26, for example, resets the execution count to an initial value (for example, zero) when the ignition apparatus (IG) is turned on (a system of the vehicle 2 is activated), and then the third processing unit 26 increments the execution count by one each time a value indicating that brief stopping has been executed is input as the first feature. The third processing unit 26 calculates a value indicating the execution count when the IG is turned off next time as the execution count Na of brief stops during one trip.

The third processing unit 26 calculates an execution rate Ra of brief stops during one trip using the execution count Na and a reference count Nb. The third processing unit 26 divides the execution count Na by the reference count Nb, and calculates a rate expressed as a percentage as an execution rate Ra of brief stops. The reference count Nb indicates the number of times a driver of the vehicle 2 should have made a brief stop during one trip. For example, the reference count Nb may be set in advance using the execution count of brief stops made while a skilled driver drives a vehicle of the same class as the vehicle 2 along the route traveled by the vehicle 2 during one trip. Alternatively, for example, for the third processing unit 26, the number of times (number of brief stops that the driver would have executed when he or she were a skilled driver) the vehicle 2 should have executed a brief stop calculated using the route traveled by the vehicle 2 during one trip, the number of intersections on the route, the number of right and left turns, and the like may be set as the reference count Nb. A skilled driver is defined as, for example, a driver without accidents or violations and whose total driving time is equal to or greater than a threshold value or whose total driving distance is equal to or greater than a threshold value, but it is not limited to such definitions.

The third processing unit 26 uses the second feature to calculate an execution count Nc of slow forward movements during one trip. For example, the third processing unit 26 resets the execution count to the initial value (for example, zero) when the IG is turned on, and increments the execution count by one each time a value indicating that the slow forward movement is executed is input as the second feature. The third processing unit 26 calculates a value indicating the execution count when the IG is turned off next time as the execution count Na of slow forward movements during one trip.

The third processing unit 26 calculates an execution rate Rb of slow forward movements during one trip using the execution count Nc and a reference count Nd. The reference count Nd indicates the number of times the driver of the vehicle 2 should execute slow forward movements during one trip. For example, the reference count Nb may be set in advance using the execution count of slow forward movements performed while a skilled driver drives a vehicle of the same class as the vehicle 2 along the route traveled by the vehicle 2 during one trip. Alternatively, for example, for the third processing unit 26, the number of times (number of slow forward movements that the driver would have executed when the he or she was a skilled driver) the vehicle 2 should have executed slow forward movements calculated using the route traveled by the vehicle 2 during one trip, the number of intersections on the route, the number of right and left turns, and the like may be set as the reference count Nd.

The third processing unit 26 uses the third features to calculate an average value of the third features during one trip. For example, after the IG is turned on, the third processing unit 26 stores the third feature that has been input until immediately before each time the third feature is input. For example, the third processing unit 26 calculates the average value of the third features during one trip by dividing the total sum of the third features stored when the IG is turned off by the number of the stored third features.

Similarly, the third processing unit 26 uses the fourth features to calculate an average value of the fourth features during one trip. Since the method of calculating the average value of the fourth features is the same as the method of calculating the average value of the third features, detailed description thereof will not be repeated.

The third processing unit 26 outputs various pieces of information calculated using the first feature, the second feature, the third feature, and the fourth feature to the central ECU 40. The central ECU 40 transmits information input from the third processing unit 26 to the data center 100 via the DCM 30.

Information transmitted from the DCM 30 to the data center 100 includes, for example, the processing time, the traffic scene identification number, and the feature (a plurality of traffic scene identification numbers and features exist as a set). Therefore, the data center 100 stores the information input from the DCM 30 in the storage device 12 as a set of data. This enables the data center 100 to evaluate the driving features of each driver of the vehicles 2, 3 that can communicate with the data center 100.

The data center 100, for example, uses the output values of the third processing unit 26 to evaluate the driving features. The data center 100 can, for example, use the execution rate Ra and the execution rate Rb to compare the driving behavior of making the vehicle 3 turn right at an intersection without traffic lights with that of a skilled driver. For example, when the execution rate Ra and the execution rate Rb are both close to 100%, it can be determined that driving similar to that of a skilled driver is performed. On the other hand, when only the execution rate Ra is low, it can be determined that the driving is performed with insufficient brief stops. Further, when the execution rate Rb is low, it can be determined that the driving is performed with insufficient two-step safety confirmation by slow forward movements. The evaluation of such driving features may also be executed in the third processing unit 26.

Figure 5:
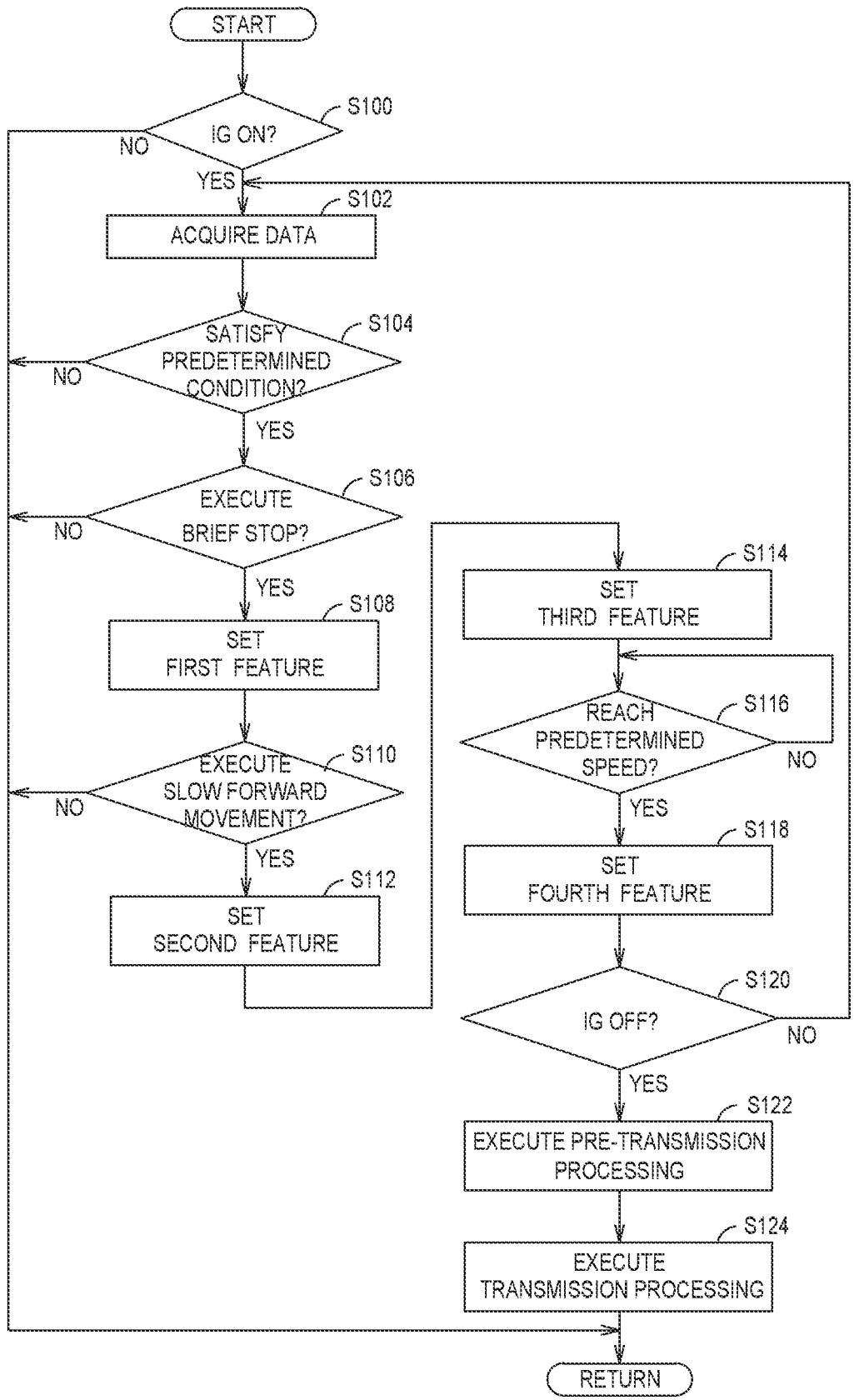
FIG. 5 is a flowchart illustrating an example of processing executed by a brake ECU.

Next, an example of processing executed by the brake ECU 20 of the vehicle 2 will be described with reference to FIG. 5. FIG. 5 is a flowchart illustrating an example of processing executed by the brake ECU 20. A series of processes illustrated in this flowchart are repeatedly executed by the brake ECU 20 at predetermined control cycles.

In step (hereinafter step is described as S) 100, the brake ECU 20 determines whether the IG is turned on. For example, when the vehicle 2 is activated by accepting an activation operation by a user while the IG is in the OFF state, the brake ECU 20 determines that the IG is turned on. When the brake ECU 20 determines that the IG has been turned on (YES in S100), the process proceeds to S102.

In S102, the brake ECU 20 acquires data corresponding to the input information. Specifically, the brake ECU 20 acquires data corresponding to the input information including, for example, information indicating the degree of depression of the accelerator pedal, information on the state of the stop lamp switch 64, information on the rotation number of the driving wheel 50, and information on the rotation number of the driven wheel 52.

In S104, the brake ECU 20 determines whether the predetermined conditions are satisfied. Since the predetermined conditions are as described above, a detailed description thereof will not be repeated. When the brake ECU 20 determines that the predetermined conditions are satisfied (YES in S104), the process proceeds to S106.

In S106, the brake ECU 20 determines whether a brief stop has been executed. Since the method of determining whether the brief stop has been executed is as described above, detailed description thereof will not be repeated. When the brake ECU 20 determines that the brief stop has been executed (YES in S106), the process proceeds to S108.

In S108, the brake ECU 20 sets a value indicating that the vehicle 2 has stopped briefly as the first feature. Then, the process proceeds to S110.

In S110, the brake ECU 20 determines whether the slow forward movement has been executed. Since the method of determining whether the slow forward movement has been executed is as described above, detailed description thereof will not be repeated. When the brake ECU 20 determines that the vehicle 2 has moved slowly forward (YES in S110), the process proceeds to S112.

In S112, the brake ECU 20 sets a value indicating that the vehicle 2 has moved forward slowly as the second feature. Then, the process proceeds to S114.

In S114, the brake ECU 20 sets the third feature. Since the method of setting the third feature is as described above, detailed description thereof will not be repeated. Then, the process proceeds to S116.

In S116, the brake ECU 20 determines whether the speed of the vehicle 2 has reached a predetermined speed. Since the predetermined speed is as described above, detailed description thereof will not be repeated. When the brake ECU 20 determines that the speed of the vehicle 2 has reached the predetermined speed (YES in S116), the process proceeds to S118.

In S118, the brake ECU 20 sets the fourth feature. Since the method of setting the fourth feature is as described above, detailed description thereof will not be repeated. Then, the process proceeds to S120.

When the brake ECU 20 determines that the IG is not turned on (NO in S100), when the brake ECU 20 determines that the predetermined conditions are not satisfied (NO in S104), when the brake ECU 20 determines that the brief stop has not been executed (NO in S106), or when the brake ECU 20 determines that slow forward movement has not been executed (NO in S110), this process is terminated. When the brake ECU 20 determines that the speed of the vehicle 2 has not reached the predetermined speed (NO in S116), the process returns to S116.

In S120, the brake ECU 20 determines whether the IG is turned off. For example, when the vehicle 2 enters an activation stop state by accepting an activation stop operation by the user while the IG is in the ON state, the brake ECU 20 determines that the IG is turned off. When the brake ECU 20 determines that the IG has been turned off (YES in S120), the process proceeds to S122.

In S122, the brake ECU 20 executes pre-transmission processing. The brake ECU 20 generates information necessary for determining, in the data center 100, whether the change history of the feature corresponds to a predetermined state. The brake ECU 20, for example, uses the first feature, the second feature, the third feature, and the fourth feature to calculate the execution rates Ra, Rb, the average value of the third feature, and the average value of the fourth feature, as described above.

In S124, the brake ECU 20 executes transmission processing. The brake ECU 20 transmits the generated information to the central ECU 40. The central ECU 40 transmits the received information to the data center 100 via the DCM 30. Since the information transmitted to the data center 100 and the processing performed in the data center 100 are as described above, detailed description thereof will not be repeated.

When the brake ECU 20 determines that the IG is not turned off (NO in S120), the process returns to S102.

Figure 6:
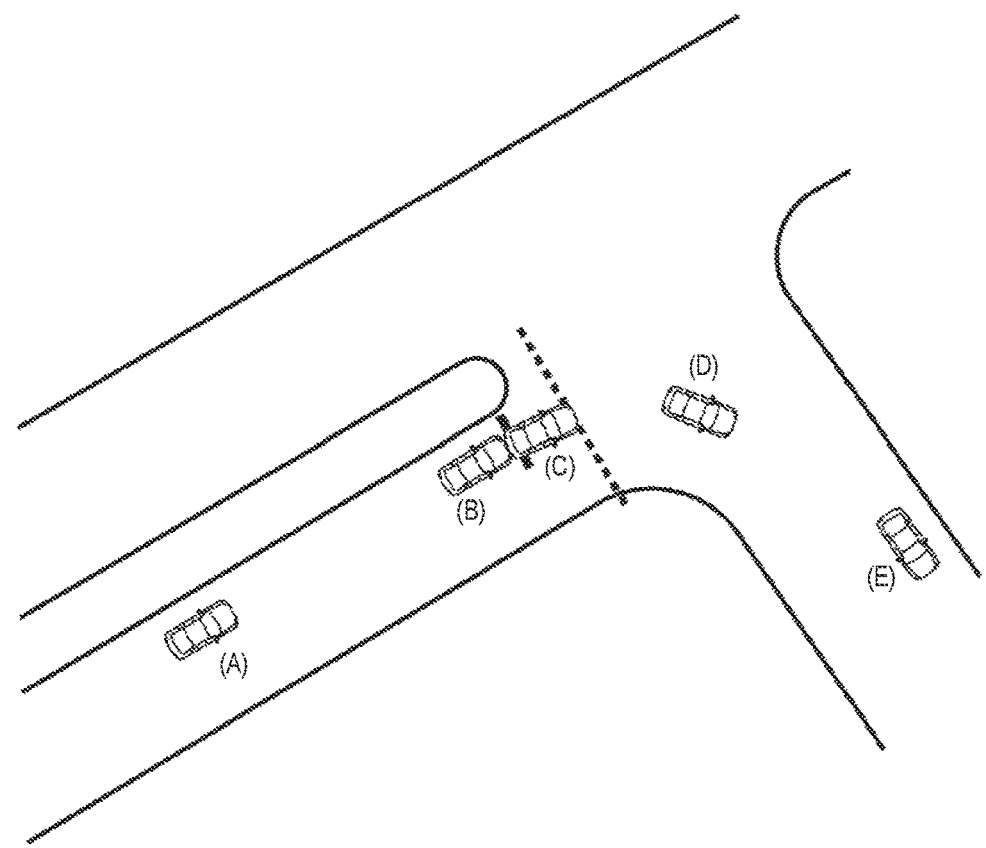
FIG. 6 is a diagram for illustrating an example of a driving operation when turning right after briefly stopping at an intersection.
Figure 7:
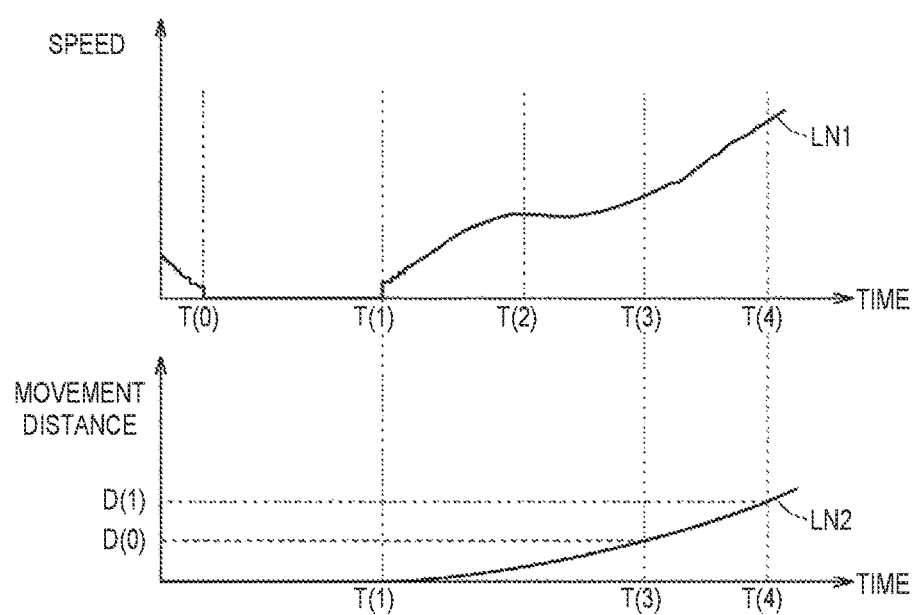
FIG. 7 is a time chart for illustrating an operation of the brake ECU.

The operation of the brake ECU 20, which is the information processing device according to the present embodiment, based on the above structure and flowchart will be described with reference to FIGS. 6 and 7. FIG. 6 is a diagram for illustrating an example of a driving operation when turning right after briefly stopping at an intersection. In FIG. 6, for example, it is assumed that a vehicle makes a right turn at an intersection without traffic lights. FIG. 7 is a time chart for illustrating the operation of the brake ECU 20. Two vertical axes in FIG. 7 respectively indicate the speed of the vehicle 2 and the movement distance of the vehicle 2 after a brief stop. Both horizontal axes in FIG. 7 indicate time. LN1 in FIG. 7 indicates a change in speed of the vehicle 2. In addition, LN2 in FIG. 7 indicates a change in movement distance after the vehicle 2 is briefly stopped.

For example, when the IG is turned on (YES in S100) and the vehicle 2 starts traveling, data including input information is acquired (S102). Then, as illustrated in (A) of FIG. 6, it is assumed that the vehicle 2 decelerates before the intersection.

For example, when the speed of the vehicle 2 exceeds a threshold value, the accelerator release operation is performed, and when the acceleration of the vehicle 2 is less than zero, the brake ECU 20 determines that the predetermined conditions are satisfied (YES in S104).

As illustrated in (B) of FIG. 6, the vehicle 2 continues traveling until it stops at a stop line, so that the brake ECU 20 determines that the vehicle 2 has not stopped briefly (NO in S106), On the other hand, as indicated by LN1 in FIG. 7, at time T(0), when a predetermined time elapses after the vehicle 2 at a position illustrated in (B) of FIG. 6 stops before the stop line, the brake ECU 20 determines that the brief stop has been executed (YES in S106), so that a value indicating that the brief stop has been executed is set as the first feature (S108).

Then, when the driver performs an accelerator-depression operation at time T(1) as illustrated by LN1 in FIG. 7, the vehicle 2 starts moving. As illustrated in (C) of FIG. 6, until a position (broken line in FIG. 6) provides a wider view of a road, enabling the vehicle 2 to detect whether there are any moving objects on a road that intersects the road the vehicle 2 is traveling on, that is, as indicated by LN1 in FIG. 7, when the slow forward movement is executed between time T(2) and time T(3) (YES in S110), the second feature is set (S112). In this case, by traveling between time T(1) and time T(3) in FIG. 7, a movement distance D(0) traveled from the stop position of the vehicle 2 illustrated in (B) of FIG. 6 to a destination position illustrated in (C) of FIG. 6 is set as the third feature (S114).

Then, the vehicle 2 starts to accelerate from the position illustrated in (C) of FIG. 6, turns right while increasing speed as illustrated in (D) of FIG. 6, and travels in a traveling lane after turning right. In this case, when the speed of the vehicle 2 at the position illustrated in (E) of FIG. 6 reaches a predetermined speed at time T(4) (YES in S116), a movement distance D(1), by traveling between time T(1) and time T(4) in FIG. 7, from the stop position of the vehicle 2 illustrated in (B) of FIG. 6 to the position where the vehicle 2 reaches the predetermined speed illustrated in (E) of FIG. 6 is set as the fourth feature (S118).

Then, when the vehicle 2 makes a right turn at a similar intersection, the first feature, the second feature, the third feature, and the fourth feature are set. Then, when the IG of the vehicle 2 is turned off (YES in S120), pre-transmission processing is executed (S122). By executing the pre-transmission processing, the execution rate Ra of the brief stop is calculated using the first feature, and the execution rate Rb of the slow forward movement is calculated using the second feature. Further, the average value of the movement distance until the slow forward movement, is completed is calculated using the third feature, and the average value of the movement distance until reaching the predetermined speed is calculated using the fourth feature. Then, transmission processing is executed to transmit the calculated various pieces of information to the data center 100 via the central ECU 40 and the DCM 30 (S124). The data center 100 also receives similar various pieces of information as those of the vehicle 2 from the vehicle 3.

As described above, with the information processing device according to the present embodiment, when the vehicle 2 is briefly stopped, the information on the speed of the vehicle 2 can be used to calculate the first feature, the second feature, the third feature, and the fourth feature related to the driving of the vehicle 2. Therefore, it is possible to calculate features and acquire information on driving features without using devices such as sensors and image identification devices. Therefore, it is possible to provide an information processing device, a vehicle, an information processing system, an information processing method, and a program that enable appropriate evaluation of driving features without using an image identification device.

In particular, by acquiring information on driving features in a situation where the vehicle 2 moves slowly forward after the brief stop as the first feature, the second feature, the third feature, and the fourth feature, driving features can be evaluated in a situation where the vehicle 2 makes a right turn at an intersection without traffic lights. Therefore, that allows for the differentiation of the situation from a situation in which brief stops are repeatedly encountered during traffic congestion.

Further, by calculating the execution rate Ra of the brief stops as a feature related to driving and the execution rate Rb of slow forward movements as information on safety confirmation in an advancing direction of the vehicle 2 after the brief stop, it is possible to compare the driver of the vehicle 2 with a skilled drier, so it is possible to appropriately evaluate the driving features of the vehicle.

In further embodiments, based on the average value of the third features, the average value of the fourth features, and the like, it is possible to appropriately evaluate the driving features of the driver in a specific driving environment such as turning right at an intersection without traffic lights.

Further, when each feature is calculated within the vehicle, there is no need to transmit information for calculating each feature to the outside. Therefore, when, for example, the amount of pieces of information needed to calculate each feature is large, unnecessary information is suppressed from being transmitted outside the vehicle, and thus the increase in communication load and storage capacity and processing costs at the data center are suppressed.

Furthermore, by performing the calculation of each feature and the generation of information using each feature separately in the second processing unit 24 and the third processing unit 26, for example, it is possible to change only the method of generating information using features in the third processing unit 26 and use it to generate information on changes in other vehicles. Such a change can be realized, for example, by having the brake ECU 20 read update information received from the data center 100 and stored in the memory of the central ECU 40.

Modification examples will be described below. In the embodiment described above, a case where, by executing processing illustrated in the flowchart of FIG. 5, the input information input to the brake ECU 20 is processed inside the brake ECU 20 to calculate each feature and to generate information on driving features using each feature is described as an example. However, the processing may be performed in the data center 100.

Furthermore, in the above-described embodiment, the data center 100 may receive information on changes in vehicles from a plurality of vehicles without specifying a source vehicle by the processing time and the traffic scene identification signal.

Further, in the above-described embodiment, the predetermined conditions include the first condition, the second condition, and the third condition. However, in addition to or in lieu of these conditions, they may include a condition that the elapsed time since the IG is turned on is within a threshold value (for example, several minutes), and a condition that the speed history of the vehicle 2 up to the previous time is used to have a speed history within a range not exceeding a threshold value (for example, about 20 kilometers per hour). In a period of about several minutes after the IG is turned on, the situation is immediately after the vehicle 2 leaves a parking lot, and thus at an intersection without traffic lights, it can be determined whether a driving operation is performed before the brief stop of the vehicle 2.

All or part of the modification examples described above may be combined as appropriate. It should be considered that the embodiments disclosed this time are illustrative in all respects and not restrictive. The scope of the present disclosure is indicated by the scope of the claims rather than the above description, and is intended to include all changes within the meaning and range of equivalents of the scope of the claims.

What is claimed is:

1. An information processing device configured to generate driving information regarding a manner in which a vehicle has been driven, the driving information being generated without using an image identification device, the information processing device comprising:
   an electronic control unit configured to:
      receive input information including information on a speed of the vehicle output by a wheel speed sensor of the vehicle during a second period during which an ignition apparatus of the vehicle is in an ON state;
      determine, without using the image identification device, whether the vehicle has performed a predetermined driving operation before a brief stop of the vehicle subsequent to the ignition apparatus having been placed in the ON state;
   when it has been determined that the predetermined driving operation was performed, determine whether the vehicle has performed the brief stop by using the input information that was received during a first period that is included in the second period in which the input information is received;
      during the second time period in which the ignition apparatus remains in the ON state, maintain a first count of a total number of times that the vehicle was determined to have performed the brief stop after determining that the predetermined driving operation was performed; and
      calculate a first ratio of the first count of the total number of times that the vehicle was determined to have performed the brief stop to a first reference count that represents a number of times that the vehicle should have performed the brief stop during the second period.

2. The information processing device according to claim 1, wherein the predetermined driving operation before the brief stop includes a first condition that the speed of the vehicle exceeded a first threshold, a second condition that an accelerator release operation was performed, and a third condition that the vehicle was in a decelerating state.

3. The information processing device according to claim 1, wherein it is further determined (a) whether the predetermined driving operation was performed within a predetermined period of time after the ignition apparatus was switched to the ON state, and (b) whether the speed of the vehicle is equal to or less than a threshold value.

4. The information processing device according to claim 1, wherein the electronic control unit is further configured to:
   determine whether the vehicle executed a slow forward movement after the brief stop;
   during the second time period in which the ignition apparatus remains in the ON state, maintain a second count of a total number of times that the vehicle was determined to have executed the slow forward movement after the brief stop; and
   calculate a second ratio of the second count of the total number of times that the vehicle was determined to have executed the slow forward movement after the brief stop to a second reference count that represents a number of times that the vehicle should have executed the slow forward movement after the brief stop during the second period.

5. A vehicle comprising the information processing device according to claim 1.

6. An information processing system comprising:
   the information processing device according to claim 1; and
   a server configured to manage information transmitted from the information processing device, the information that is transmitted including the first ratio.

7. An information processing method of generating driving information regarding a manner in which a vehicle has been driven, the driving information being generated without using an image identification device, the information processing method executed by an electronic control unit of the vehicle and comprising:
   receiving input information including information on a speed of the vehicle output by a wheel speed sensor of the vehicle during a second period during which an ignition apparatus of the vehicle is in an ON state;
   determining, without using the image identification device, whether the vehicle has performed a predetermined driving operation before a brief stop of the vehicle subsequent to the ignition apparatus having been placed in the ON state;
   when it has been determined that the predetermined driving operation was performed, determining whether the vehicle has performed the brief stop by using the input information that was received during a first period that is included in the second period in which the input information is received;
   during the second time period in which the ignition apparatus remains in the ON state, maintaining a first count of a total number of times that the vehicle was determined to have performed the brief stop after determining that the predetermined driving operation was performed; and
   calculating a first ratio of the first count of the total number of times that the vehicle was determined to have performed the brief stop to a first reference count that represents a number of times that the vehicle should have performed the brief stop during the second period.

8. A non-transitory storage medium that stores instructions executable by one or more processors of a computer and causing the one or more processors to perform an information processing method of generating driving information regarding a manner in which a vehicle has been driven, the driving information being generated without using an image identification device, the instructions including instructions to:

receive input information including information on a speed of the vehicle output by a wheel speed sensor of the vehicle during a second period during which an ignition apparatus of the vehicle is in an ON state;

determine, without using the image identification device, whether the vehicle has performed a predetermined driving operation before a brief stop of the vehicle subsequent to the ignition apparatus having been placed in the ON state;

when it has been determined that the predetermined driving operation was performed, determine whether the vehicle has performed the brief stop by using the input information that was received during a first period that is included in the second period in which the input information is received;

during the second time period in which the ignition apparatus remains in the ON state, maintain a first count of a total number of times that the vehicle was determined to have performed the brief stop after determining that the predetermined driving operation was performed; and calculate a first ratio of the first count of the total number of times that the vehicle was determined to have performed the brief stop to a first reference count that represents a number of times that the vehicle should have performed the brief stop during the second period.

\* \* \* \* \*